US007986773B2

(12) United States Patent
Kalahasti et al.

(10) Patent No.: US 7,986,773 B2
(45) Date of Patent: Jul. 26, 2011

(54) INTERACTIVE VOICE RESPONSE SYSTEM SECURITY

(75) Inventors: Soumya K. Kalahasti, Fremont, CA (US); Parameswaran Kumarasamy, San Jose, CA (US); Prasad Miriyala, Union City, CA (US)

(73) Assignee: Cisco Technology, Inc., San Jose, CA (US)

( * ) Notice: Subject to any disclaimer, the term of this patent is extended or adjusted under 35 U.S.C. 154(b) by 1366 days.

(21) Appl. No.: 11/468,194

(22) Filed: Aug. 29, 2006

(65) Prior Publication Data

US 2008/0056464 A1   Mar. 6, 2008

(51) Int. Cl.
*H04M 1/64* (2006.01)
*H04L 29/06* (2006.01)
*H04K 1/00* (2006.01)

(52) U.S. Cl. ........................ 379/88.23; 713/162; 380/255

(58) Field of Classification Search .......... 370/352–356; 709/206, 228; 380/44, 277; 713/168; 379/88.23
See application file for complete search history.

(56) References Cited

U.S. PATENT DOCUMENTS

| 6,567,511 | B2 * | 5/2003 | Betts et al. | 379/192 |
| 6,885,737 | B1 * | 4/2005 | Gao et al. | 379/93.17 |
| 7,653,183 | B2 * | 1/2010 | Patel et al. | 379/88.18 |
| 7,668,303 | B2 * | 2/2010 | Peters et al. | 379/201.01 |
| 2003/0131236 | A1 * | 7/2003 | Sasmazel | 713/171 |
| 2004/0022237 | A1 * | 2/2004 | Elliott et al. | 370/356 |
| 2004/0136509 | A1 * | 7/2004 | Reynolds | 379/88.18 |
| 2005/0163316 | A1 | 7/2005 | Wing | |
| 2005/0254656 | A1 * | 11/2005 | Rose et al. | 380/277 |
| 2005/0265349 | A1 | 12/2005 | Garg et al. | |
| 2008/0037775 | A1 * | 2/2008 | Gilman | 380/44 |
| 2010/0005293 | A1 * | 1/2010 | Errico | 713/165 |

OTHER PUBLICATIONS

Securing Communications Over Packet Networks, White Paper, AudioCodes, Version 3.0, Jan. 2004, 10 pages.
IPsec (IP Security), http://en.wikipedia.org/w/index.php?title=IPsec&printable=yes, Feb. 13, 2008, 8 pages.

* cited by examiner

*Primary Examiner* — Fan Tsang
*Assistant Examiner* — Mohammad Islam
(74) *Attorney, Agent, or Firm* — Haynes and Boone, LLP

(57) ABSTRACT

In one embodiment, a method includes initiating an interactive voice response (IVR) session with a user over an IP network, identifying an imminent secure session event, and initiating an encrypted mode for the IVR session.

22 Claims, 3 Drawing Sheets

INTERACTIVE VOICE RESPONSE SYSTEM SECURITY

BACKGROUND

With the increased availability of broadband Internet connections, the use of Voice over Internet Protocol (VoIP) to make telephone calls over the Internet has also increased. In many cases, sensitive information is passed between endpoints in a VoIP system. This is especially common in interactive voice response (IVR) applications in which an individual on one end of the call interacts with an IVR computer system on the other end of the call. Typically, the IVR system plays pre-recorded voice prompts in response to which the individual speaks a response or presses a number on the telephone keypad to select an option.

One popular IVR application relates to prepaid and postpaid calling card services, in which a caller wishing to make a telephone call first dials into a service provider's main phone number. The service provider's IVR server prompts the caller to enter an account ID and optionally a password or PIN using the telephone keypad. In some cases, the caller may be required to enter a credit card number for billing purposes. Once the caller is authenticated by the IVR server, the caller is prompted to dial the destination number. The service provider will then route the call to the destination number and will charge the call to the caller's account.

A wide range of voice security features have been developed to protect the sensitive information entered by users. For example, media encryption using Secure Real-time Transport Protocol (SRTP) is typically used for encrypting voice conversation, rendering the audio stream unintelligible to internal or external eavesdroppers who have gained access to the voice domain. Designed specifically for VoIP packets, SRTP supports the AES encryption algorithm, and is an Internet Engineering Task Force (IETF) RFC 3711 standard. IPsec (IP security) is another standard used for securing VoIP communications at the network layer by encrypting and/or authenticating all IP packets. Unfortunately, the use of SRTP and IPsec to encrypt VoIP calls can place a significant burden on network resources, including bandwidth availability and digital signal processing (DSP) hardware. Thus, the number of simultaneous sessions capable of being supported by a particular gateway device or IVR server may be substantially limited if conventional encryption methods are used.

DESCRIPTION OF EXAMPLE EMBODIMENTS

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Some portions of the detailed description which follows are presented in terms of procedures, steps, logic blocks, processing, and other symbolic representations of operations on data bits that can be performed on computer memory. Each step may be performed by hardware, software, firmware, or combinations thereof.

In particular embodiments, systems and methods are provided for encrypting portions of a VoIP call between a user and an Interactive Voice Response (IVR) system. The IVR system will identify an imminent secure session event and automatically initiate an encrypted mode for VoIP call based on the context of the IVR session. For example, when the IVR system prompts the user to provide sensitive information, such as a credit card or social security number, the IVR system will first enter an encrypted mode prior to receiving the sensitive information. This encrypted mode can be initiated by transmitting an in-band or out-of-band signal to the VoIP endpoint associated with the user to instruct the endpoint to transmit the user's input (e.g., either key press or voice input) using encrypted SRTP packets. Once the secure session event has passed (e.g., the user has completed inputting the requested information), the IVR system will terminate the encrypted mode. Further communications between the IVR system and the endpoint will be unencrypted (e.g., using RTP packets). By limiting the portions of the call that are encrypted, the network resources consumed for encrypting and unencrypting the packets of data may be reduced.

Figure 1:
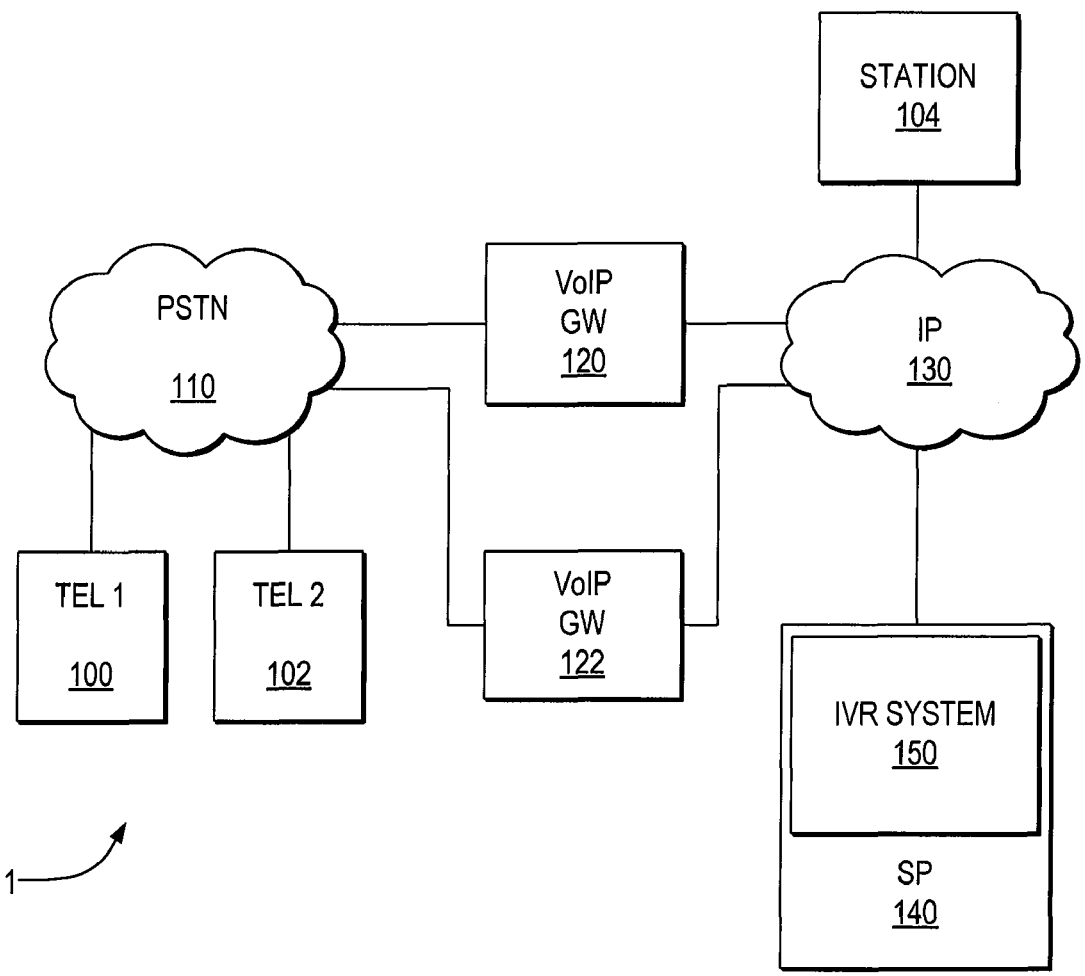
FIG. 1 illustrates an example VoIP environment.

FIG. 1 illustrates an example VoIP environment 1, in particular embodiments. This environment 1 includes a first telephone 100 connected to the Public Switched Telephone Network (PSTN) 110, and a first VoIP gateway (VoIP GW) 120 coupled to a service provider (SP) 140 via an IP network 130, such as, e.g., the Internet. The SP 140 includes an IVR system 150 that allows a person using telephone 100 to interface with a computer system and select one or more options from a voice menu provided by the IVR application 150, as will be described in greater detail below.

A user may use telephone 100 to call the service provider 140 in order to access the IVR system 150. The IVR system 150 may provide a variety of services, such as telephone banking, order placement, caller identification and routing, balance inquiry, and airline ticket booking. In some cases, IVR systems are used at the front end of call centers to identify the service desired by the caller and to extract information, such as account and PIN numbers, as well as to provide answers to simple questions and other pre-recorded information. The IVR system 150 may be implemented as an application running on a server, such as a Cisco IOS gateway device by Cisco Systems, Inc., of San Jose, Calif.

Figure 2:
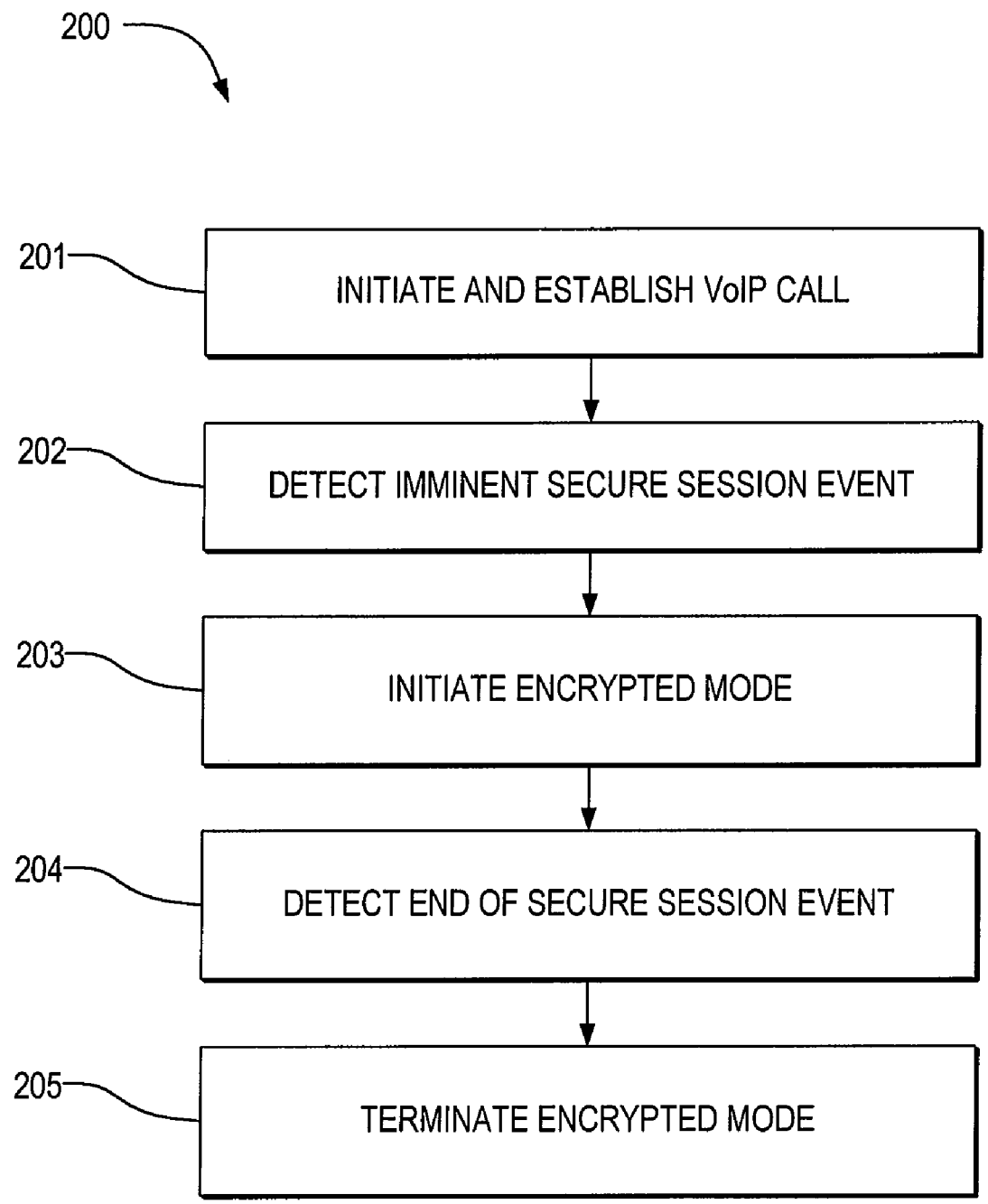
FIG. 2 illustrates an example method for managing a VoIP session.

FIG. 2 illustrates an example method for managing a VoIP session in particular embodiments. In step 201, a VoIP call is initiated and established. This call could be placed, e.g., by a telephone 100 on the PSTN 110 to a VoIP gateway 120, by a VoIP client station 104, or by the IVR system 150.

In step 202, an imminent secure session event is identified. The secure session event may be any media transmission from a first endpoint to a second endpoint (or to a plurality of endpoints). During an IVR session, the secure session event may be, for example, when the IVR system 150 prompts the user to provide sensitive information, such as an account number, a credit card number, a social security number, or a PIN number. Only certain prescribed events may be appropriate for encryption. Other portions of the IVR session may not involve the exchange of sensitive information and may therefore be transmitted using unencrypted packets of data. The IVR system 150 typically provides one or more scripts or menus that may be navigated by the user. Certain portions, such as the pre-recorded greetings or Music-On-Hold audio need not be encrypted.

Because the sequence of events during the IVR session are controlled by the IVR system 150, the IVR system 150 will know in advance or dynamically when sensitive information will be provided by the user. Prior to receiving this sensitive information, the IVR system 150 will initiate an encrypted mode for the IVR session in step 203. The encrypted mode may be initiated prior to, simultaneous with, or immediately after prompting the user to provide the sensitive information. With this, media packets are encrypted and hence a secured media session may proceed.

In step 204, the IVR system 150 identifies an end of the secure session event, and in step 205, the IVR system 150 terminates the encrypted mode and unencrypted communications between the user and the IVR system 150 may resume. As described above, the IVR system 150 will know in advance when sensitive information will be provided by the user. The IVR system 150 will similarly know when the sensitive information has been received and the secure session is no longer needed. At that point, the IVR system 150 may terminate the encrypted mode and continue with an unencrypted media session.

Figure 3:
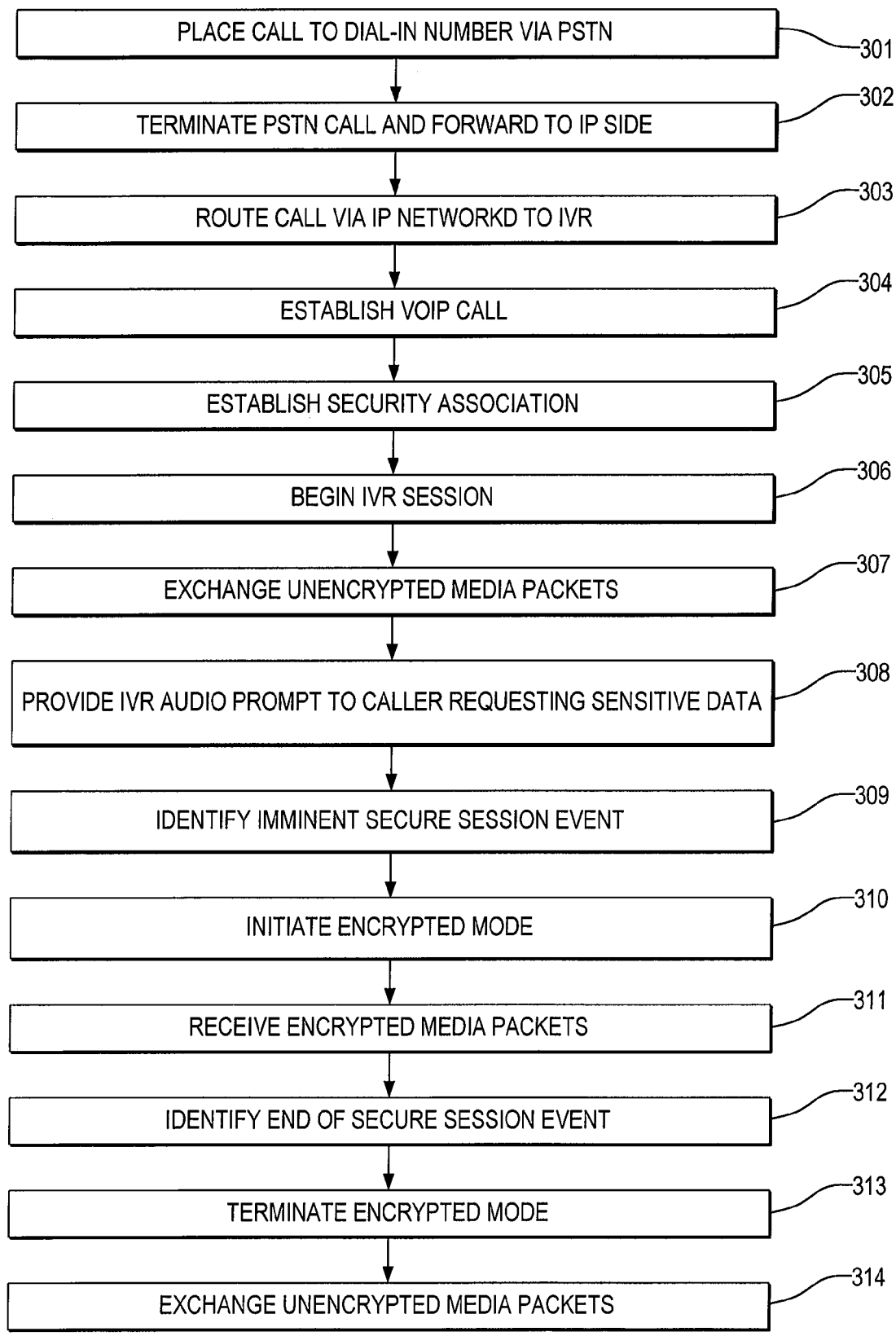
FIG. 3 further illustrates an example method of managing a VoIP session.

FIG. 3 further illustrates an example method of managing a VoIP session in particular embodiments. In step 301, a user places a telephone call to a dial-in number associated with the service provider 140. In this example, the IVR application is a calling card application which enables a user to dial into a toll-free or local number associated with the service provider 140 in order to place a long distance call through the service provider 140.

This call will be routed through the PSTN 110 to a VoIP ingress gateway 120, which terminates the PSTN call in step 302. The ingress gateway 120 compresses audio signals from the PSTN 110 and converts the compressed audio signals into packets that are then transported over the IP network 130. In step 303, the call will then be routed as a VoIP call over the IP network 130 to the IVR system 150. In step 304, the VoIP call is established. At this point, the connection between an endpoint in the ingress gateway 120 and an endpoint in the IVR system 150 is established. Audio may be exchanged between the endpoints via Real-time Transport Protocol (RTP), which defines a standardized packet format typically used in VoIP systems for delivering audio and video over an IP network.

In some embodiments, it may be desirable for the two endpoints to establish a security association immediately upon connection between the IVR system 150 and the ingress gateway 120, even though the exchange of data will remain unencrypted until the IVR system 150 initiates the encrypted mode. The security association is the set of security information that two entities share in order to support secure communication, such as encryption capabilities, encryption method, encryption keys, and lifetime. It may be desirable to establish the security association in advance of beginning the encrypted mode because of the time required for the exchange of information. Delays encountered during the initial call setup may be more tolerable than delays that are encountered in the middle of a call. In addition, the IVR session may include multiple secure session events, so the IVR session may transition from unencrypted to encrypted mode and back multiple times during a single call. The same security association may be used for all of these transitions.

In this example, SRTP is used for media encryption. The key exchange protocol used for the security association may be any protocol, such as, for example, Multimedia Internet KEYing (MIKEY) or ZRTP, which is a key agreement protocol which performs Diffie-Hellman key exchange during call setup in-band in the RTP media stream.

In step 306, the IVR session begins. In the calling card example, the IVR system 150 will first provide a pre-recorded audio greeting to the user. This audio greeting does not contain sensitive information and may therefore be transmitted using an unencrypted RTP media stream in step 307.

In step 308, the IVR system 150 may provide a pre-recorded audio prompt requesting that the user provide sensitive information, such as a calling card account number and/or PIN. In step 309, the IVR system 150 will identify that a secure session event (namely, the receipt of the account number from the user) is imminent. This identification may be performed implicitly by the IVR system 150 based on the context of the IVR session without any specific request by a user. Therefore, in step 310, the IVR system 150 will initiate an encrypted mode for the IVR session.

This encrypted mode may be initiated in a variety of ways. For example, the encrypted mode may be implemented with an in-band or an out-of-band signal to the endpoint (e.g., gateway 120). This signal will indicate "SRTP-On" to the endpoint, thereby instructing the endpoint to switch to an SRTP media stream. RFC 2833, "RTP Payload for DTMF Digits, Telephony Tones and Telephony Signals," incorporated by reference herein in its entirety, describes a protocol for carrying DTMF signaling, and other telephony events in RTP packets. Alternatively, a Named Services Event (NSE) may also be used for transmitting this "SRTP-On" signal via RTP packets. It may be desirable in some embodiments to transmit these messages via the existing media path in order to establish the secure call as quickly as possible. However, in other embodiments, it may be desirable to transmit these messages over the signaling path.

After receiving the signal from the IVR system 150, the gateway 120 will enter an encrypted mode and begin transmitting the audio from the user via SRTP. This will initialize the sequence numbers, timestamps, and security contexts at both endpoints. In step 311, the IVR system 150 will begin receiving the SRTP packets from the gateway 120. These SRTP packets will contain the sensitive information provided by the user. This information may comprise, e.g., audio of the user's spoken account numbers or DTMF digits corresponding to the account numbers.

After the IVR system 150 has received the requested account and/or PIN information, the IVR system 150 will determine based on its knowledge of the login sequence for the calling card application that no further sensitive information will be provided by either endpoint. Thus, in step 312, the IVR system 150 will identify that the secure session event is complete. In step 313, the IVR system 150 will transmit an "SRTP-Off" signal, using, e.g., the same signaling protocol described above with respect to step 310. Further data exchange between the endpoints may be performed in step 314 using an RTP stream. The sequence number in the RTP packets may once again start from zero. It may be desirable in some embodiments for the signaling method for switching from encrypted to unencrypted mode be secure, in order to prevent third parties from issuing commands to change the mode.

In the calling card example, the user will have been authenticated using the account and/or PIN number, and will therefore be allowed to dial the desired long-distance telephone number. The IVR system 150 will then route the call to the target station, which may be, e.g., station 104 or telephone 102 via a second gateway 122 and the PSTN 110. In other embodiments, the IVR session may continue with further information exchanged between the IVR system 150 and the telephone 100. If additional sensitive information is to be requested, the IVR system 150 will again identify the imminent secure session event and initiate an encrypted mode accordingly.

Particular embodiments may be used in various applications. For example, in some situations, such as for highly sensitive telephone calls, it may be desirable to mislead eavesdroppers by establishing simultaneous RTP and SRTP media streams. Thus, a VoIP call may proceed using an RTP stream. Then, before sensitive information is exchanged between the endpoints, an SRTP media stream is initiated and used for exchanging the sensitive information. However, the RTP stream may continue to exchange fake or irrelevant audio. Thus, any eavesdropper would assume that the call was continuing with the irrelevant audio without realizing that secure information was being exchanged in a separate stream.

Other embodiments may be useful for call center applications in which a VoIP call may be monitored by a third party. In this case, the third party would be able to monitor the unencrypted transmissions (e.g., in order to monitor the quality of customer service), but since it is not necessary for the third party to receive the sensitive information, such as the user's credit card number, the third party's endpoint would not be able to decrypt the secure SRTP media packets.

Particular embodiments may provide various advantages not provided by prior art systems. For example, network resources, such as utilization of the DSP for the IVR system, need not be consumed for non-sensitive information. Therefore, the IVR system would be able to support a greater number of simultaneous calls than it otherwise would be able to because all of the calls would not be encrypted for the duration of the call.

While the invention has been described in terms of particular embodiments and illustrative figures, those of ordinary skill in the art will recognize that the invention is not limited to the embodiments or figures described. For example, in many of the embodiments described above, the audio messages provided by the IVR system may be pre-recorded and replayed to the caller at appropriate times during the call. In other embodiments, the audio messages may be generated by a voice synthesis application, which converts text to spoken audio which may be heard by the caller.

In addition, the input from the user, which may be transmitted to the IVR system via encrypted or unencrypted messages, may come in a variety of forms. For example, the input may be audio of the user's voice (such as when the user speaks a credit card number into the telephone), in-band or out-of-band DTMF signals.

In various embodiments described above, the user of the telephone 100 places the call to the IVR system 150. In other embodiments, the IVR system 150 may initiate the call to the user.

The program logic described indicates certain events occurring in a certain order. Those of ordinary skill in the art will recognize that the ordering of certain programming steps or program flow may be modified without affecting the overall operation performed by the preferred embodiment logic, and such modifications are in accordance with the various embodiments of the invention. Additionally, certain of the steps may be performed concurrently in a parallel process when possible, as well as performed sequentially as described above.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method, comprising:
   initiating an interactive voice response (IVR) session with a user over an IP network;
   identifying an imminent secure session event;
   initiating an encrypted mode for the IVR session;
   identifying an end of the secure session event;
   terminating the encrypted mode for the IVR session; and
   initiating an unsecure mode for the IVR session.

2. The method of claim 1, wherein said initiating the encrypted mode comprises transmitting an in-band signal to initiate the encrypted mode.

3. The method of claim 1, wherein said initiating the encrypted mode comprises transmitting an out-of-band signal to initiate the encrypted mode.

4. The method of claim 1, wherein said identifying the imminent secure session event comprises:
   prompting the user to provide sensitive information;
   wherein the secure session event comprises receipt of the sensitive information from the user.

5. The method of claim 4, wherein the sensitive information comprises a credit card number or a debit card number.

6. The method of claim 4, wherein the sensitive information comprises an account number.

7. The method of claim 4, wherein the sensitive information comprises a password.

8. The method of claim 1, further comprising prior to determining the upcoming need for the secure session, exchanging encryption keys.

9. The method of claim 1, wherein said initiating the encrypted mode for the IVR session comprises initiating a Secure Real-Time Protocol (SRTP) session.

10. The method of claim 1, wherein said initiating the encrypted mode for the IVR session comprises initiating an encrypted session and a simultaneous unencrypted session.

11. The method of claim 1, wherein said identifying the imminent secure session event comprises receiving a call from a software application.

12. An system, comprising:
    a network interface; and
    a control system configured to:
       initiate an interactive voice response (IVR) session with a user via the network interface;
       identify an imminent secure session event;
       initiate an encrypted mode for the IVR session;
       identify an end of the secure session event;
       terminate the encrypted mode for the IVR session; and
       initiate an unsecure mode for the IVR session.

13. The system of claim 12, wherein the control system is configured to initiate the encrypted mode by transmitting an in-band signal to initiate the encrypted mode.

14. The system of claim 12, wherein the control system is configured to initiate the encrypted mode by transmitting an out-of-band signal to initiate the encrypted mode.

15. The system of claim 12, wherein the control system is configured to identify the imminent secure session event by:
    prompting the user to provide sensitive information;
    wherein the secure session event comprises receipt of the sensitive information from the user.

16. The system of claim 15, wherein the sensitive information comprises a credit card number or a debit card number.

17. The system of claim 15, wherein the sensitive information comprises an account number.

18. The system of claim 15, wherein the sensitive information comprises a password.

19. The system of claim 12, the control system is further configured to exchange encryption keys prior to determining the upcoming need for the secure session.

20. The system of claim 12, wherein the control system is configured to initiate the encrypted mode for the IVR session by initiating a Secure Real-Time Protocol (SRTP) session.

21. The system of claim 12, wherein the control system is configured to initiate the encrypted mode for the IVR session by initiating an encrypted session and a simultaneous unencrypted session.

22. The system of claim 12, wherein the control system is configured to identify the imminent secure session event by receiving a call from a software application.

\* \* \* \* \*